Patented Sept. 14, 1948

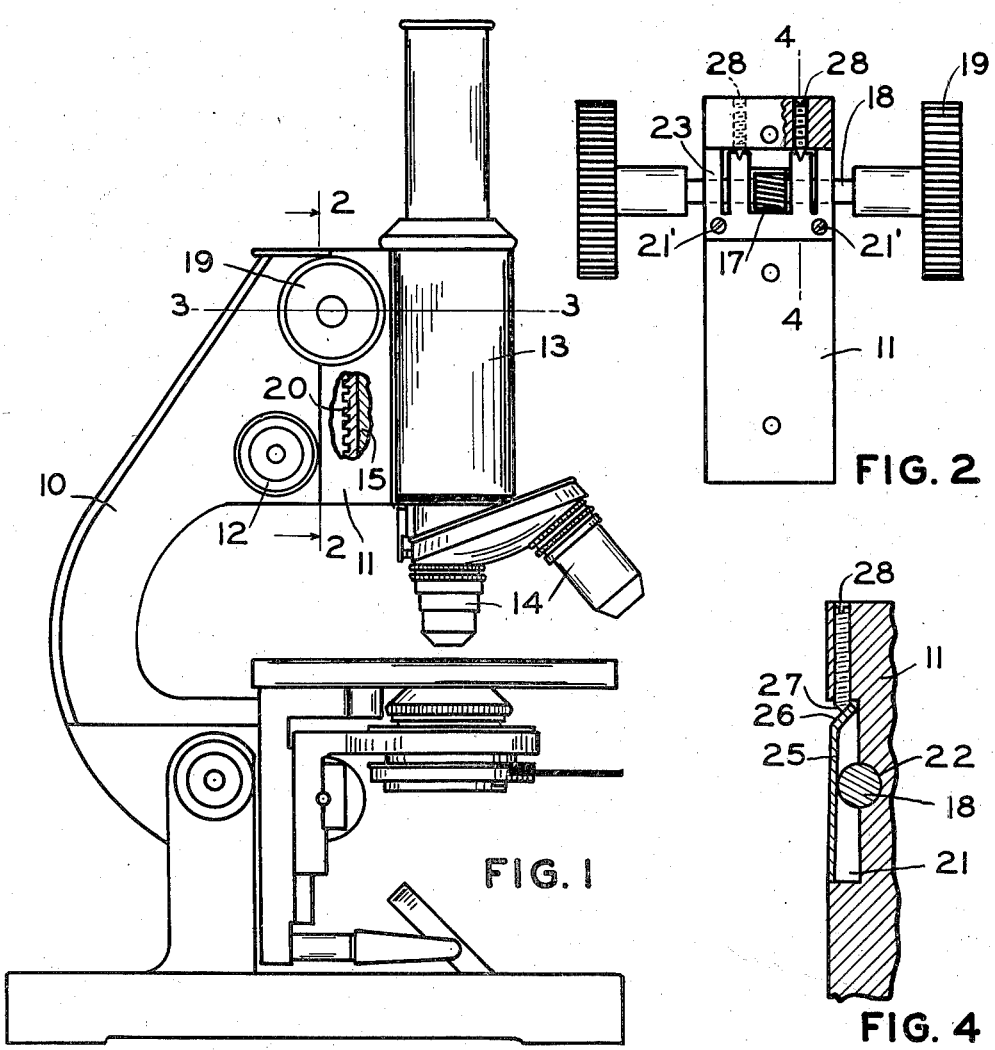
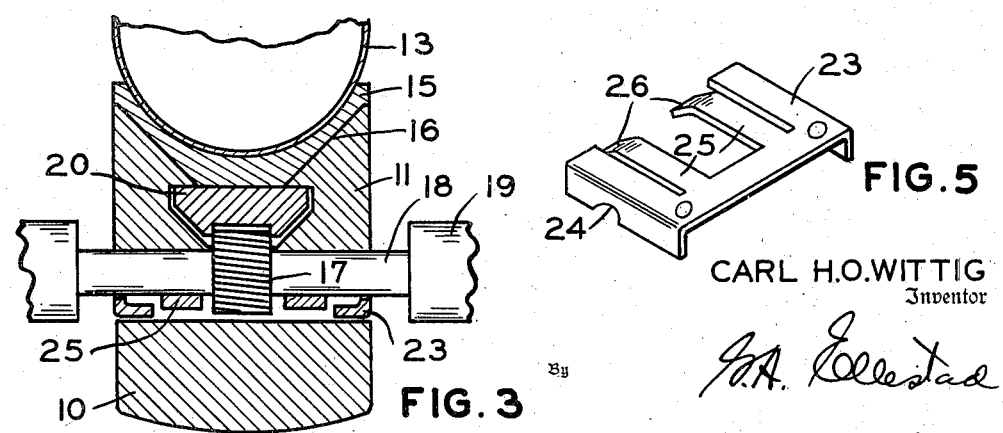

2,449,156

UNITED STATES PATENT OFFICE 2,449,156

ADJUSTABLE PINION SHAFT BEARING FOR MICROSCOPES

Carl H. O. Wittig, Irondequoit, N. Y., assignor to Bausch & Lomb Optical Company, Rochester, N. Y., a corporation of New York Application January 5, 1946, Serial No. 639,342

4 Claims. (Cl. 88—39)

This invention relates to optical instruments and more particularly it has reference to instruments, such as microscopes, which embody lens means adjustably mounted for focusing.

In such types of instruments the lens system is carried by a member which is slidably mounted on a support and adapted to be moved into adjusted position by means of a rack and pinion mechanism. Such a mechanism is commonly used for effecting the coarse adjustment of a microscope. In a microscope the lens tube is vertically slidable and hence it is necessary that sufficient frictional resistance be applied to the pinion shaft in order to hold the parts in adjusted vertical position. At the same time, it is essential that the lens tube be mounted so that it may be adjusted easily and smoothly. In the microscopes of the prior art, such frictional resistance is usually applied to the pinion shaft by means of a journal block which has a bearing portion engaging the pinion shaft. The journal block is secured to a part of the microscope stand by means of screws so that the block may be moved into frictional engagement with the shaft by means of the screws. Such a construction requires that the pinion shaft be carefully fitted to the bearing in the journal block and also that the journal block be carefully fitted to the stand so that the proper amount of tension may be applied to the shaft. This is a laborious proceeding in the manufacture of a microscope. Moreover, the desired frictional engagement between the pinion shaft and the journal block will be gradually reduced due to wear of the parts from continued use of the instrument so that the microscope will not function properly.

It is an object of the present invention to overcome the above-mentioned difficulties and to provide means whereby frictional resistance may be applied to the pinion shaft in a simple, yet efficient, manner which will not only reduce the cost of manufacture but also enable the instrument to be kept in good operating condition. A further object is to provide improved means whereby the frictional resistance on a pinion shaft of a microscope adjusting means may be selectively varied in an improved manner. Other objects and advantages reside in certain novel features of construction, arrangement, and combination of parts as will hereinafter be more fully described and pointed out in the appended claims.

Referring to the accompanying drawings:

Fig. 1 is a side elevation of a microscope embodying my invention.

Fig. 2 is a view taken on line 2—2 of Fig. 1.

Fig. 3 is a sectional view taken on line 3—3 of Fig. 1.

Fig. 4 is a fragmentary sectional view taken on line 4—4 of Fig. 2.

Fig. 5 is a perspective view of the frictional bearing member.

A preferred embodiment of my invention is disclosed in the drawings wherein there is shown a microscope having a stand 10 on which is slidably mounted the block 11 which is adapted to be adjusted by means of the fine adjustment mechanism, not shown, which is actuated by the knob 12. The body tube 13, carrying lenses 14, is secured to the slide 15 which is slidably mounted in a bearing 16 formed in block 11. The body tube 13 is adjustably moved relative to block 11 by means of a pinion 17 fixed to the pinion shaft 18 which may be turned by the knob 19. The pinion 17 coacts with a rack 20 which is secured to the slide 15 so that rotation of pinion shaft 18 will move the body tube 13.

The block 11 is provided with a recess 21 and formed with a journal portion 22 to rotatably receive the pinion shaft 18. Mounted within the recess 21, by means of screws 21', is the frictional bearing member 23 having the journal portion 24 adapted to fit over the pinion shaft 18. The bearing member 23 has formed integrally therewith the two upstanding resilient fingers 25 having their free ends formed with inclined portions 26 which are engaged by the tapered ends 27 of screws 28 threadedly mounted in the block 11 above the pinion shaft 18. The frictional member 23 is preferably formed integrally of a suitable material so that the resilient frictional fingers 25 may be urged into adjustable engagement with the side of pinion shaft 18 by means of the screws 28. I have found that good results are produced by forming the member 23 of tempered beryllium copper and making the shaft 18 of steel, but other suitable materials may also be used.

From the foregoing, it will be apparent that I am able to attain the objects of my invention and provide an improved frictional bearing member for coaction with the pinion shaft of the adjusting mechanism of an optical instrument such as a microscope. The frictional resistance on the pinion shaft may be readily adjusted by merely turning the screws 28. Consequently, the manufacturing cost will be reduced since costly hand fitting and reaming operations will be eliminated and the assembly of the parts can, therefore, be carried out by relatively unskilled operators. After the parts become worn through long continued use, it is possible to increase the frictional resistance of the pinion shaft by merely adjusting the screws 28. Various modifications can obviously be made without departing from the spirit of my invention as pointed out in the appended claims.

I claim:

1. A microscope comprising a stand, a tube slidably mounted on the stand, a lens system carried by the tube, means for moving the tube to focus the lens system, said means comprising a rack carried by the tube, said stand having a part provided with a recess adjacent the rack, a shaft rotatably mounted in a bearing seat formed in the wall of the recess, a pinion carried by the shaft, said pinion engaging the rack for moving the latter, and means for varying the frictional resistance against which the shaft may be turned, said means comprising a member secured in said recess, spaced resilient fingers integral with said member and extending upwardly therefrom, said fingers frictionally engaging the side of said shaft, the upper ends of said fingers having inclined portions, and screws threaded into the stand above said recess, said screws having tapered ends in engagement with said inclined portions whereby the frictional resistance on said shaft may be selectively varied by adjusting said screws.

2. In a microscope having a stand, a lens movably mounted on the stand, and means carried by the stand including a rotatable cylindrical shaft for moving the lens, the combination of a member carried by said stand adjacent the shaft, said member having a pair of spaced, outwardly extending, resilient fingers having substantially flat surfaces for engagement with the side of the shaft, the free ends of the fingers having inclined portions, and adjusting screws carried by the stand, the ends of the screws being in engagement respectively with the inclined portions on the fingers for urging the latter into selected frictional engagement with the shaft.

3. In an optical instrument having a support, lens means movably mounted on the support and rack and pinion means including a pinion shaft rotatable on a journal for moving the lens means, the combination with the pinion shaft of means for applying frictional resistance to the turning of the shaft independently of the journal, said last named means comprising a resilient finger engaging the side of the shaft, said finger having a free end, and screw means carried by the support and in engagement with the free end of the finger for selectively varying the frictional engagement between the finger and the shaft.

4. In a microscope the combination of a stand, a block carried by the stand, a lens tube movably mounted on the block, means for moving said lens tube comprising a rack secured to the tube, a pinion coacting with the rack, a shaft carrying the pinion, said shaft rotatably mounted in a journal seat in the block, a member secured to said block, said member also having journal seats for the shaft, resilient fingers projecting from and formed integrally with the member and having surfaces in engagement with the shaft, and means engaging the free ends of the fingers for selectively varying the frictional engagement between the fingers and shaft for adjusting the frictional resistance to the turning of the latter.

CARL H. O. WITTIG.

REFERENCES CITED

The following references are of record in the file of this patent:

UNITED STATES PATENTS

| Number | Name | Date |
|---|---|---|
| 2,365,594 | Roeder | Dec. 19, 1944 |

FOREIGN PATENTS

| Number | Country | Date |
|---|---|---|
| 291,598 | Great Britain | June 7, 1928 |